(12) United States Patent
Koretsky et al.

(10) Patent No.: US 8,517,659 B2
(45) Date of Patent: Aug. 27, 2013

(54) SELF-ALIGNING PLATFORM MECHANISM FOR LOW-FLOOR VEHICLES ACCESS DEVICE

(75) Inventors: Dmitry Koretsky, Chatsworth, CA (US); Christopher Wyszkowski, Simi Valley, CA (US); Steven Fisher, Rosamond, CA (US)

(73) Assignee: Ricon Corp., Panorama City, CA (US)

( * ) Notice: Subject to any disclaimer, the term of this patent is extended or adjusted under 35 U.S.C. 154(b) by 131 days.

(21) Appl. No.: 13/063,384

(22) PCT Filed: Oct. 7, 2009

(86) PCT No.: PCT/US2009/059813
§ 371 (c)(1),
(2), (4) Date: Apr. 21, 2011

(87) PCT Pub. No.: WO2010/042598
PCT Pub. Date: Apr. 15, 2010

(65) Prior Publication Data
US 2011/0268544 A1    Nov. 3, 2011

Related U.S. Application Data

(60) Provisional application No. 61/103,518, filed on Oct. 7, 2008.

(51) Int. Cl.
*A61G 3/06* (2006.01)
(52) U.S. Cl.
CPC ............... *A61G 3/06* (2013.01); *Y10S 414/134* (2013.01)
USPC .......................................... 414/546; 414/921

(58) Field of Classification Search
USPC ................. 296/146; 414/523, 537, 546, 921
See application file for complete search history.

(56) References Cited

U.S. PATENT DOCUMENTS

| | | | |
|---|---|---|---|
| 3,846,860 A | 11/1974 | Kummerman | |
| 3,955,827 A | 5/1976 | Wonigar | |
| 4,068,770 A | 1/1978 | Boehringer | |
| 4,124,099 A | 11/1978 | Dudynskyj | |
| 4,143,281 A * | 3/1979 | Appley | 296/146.12 |
| 4,155,468 A * | 5/1979 | Royce | 414/556 |
| 4,381,899 A | 5/1983 | Merkle | |
| 4,792,274 A | 12/1988 | Cockram | |
| 5,111,912 A | 5/1992 | Kempf | |
| 5,203,663 A | 4/1993 | Ruppe | |

(Continued)

FOREIGN PATENT DOCUMENTS

| | | |
|---|---|---|
| CA | 2630373 A1 | 11/2009 |
| WO | 2005123450 A1 | 12/2005 |

*Primary Examiner* — Saul Rodriguez
*Assistant Examiner* — Brendan Tighe
(74) *Attorney, Agent, or Firm* — The Webb Law Firm

(57) ABSTRACT

A mechanism for deploying and aligning a ramp relative to a platform includes a main bearing operatively associated with the platform and rotatable about a main pivot axis; a drive member disposed on the main bearing, the drive member being adapted to drive the main bearing to rotate about the main pivot axis; a rotating member disposed on the main bearing and rotatable about the main pivot axis with the main bearing; and a ramp member rotatably connected to the rotating member at a pivot point eccentric to the main pivot axis. Rotation of the rotating member causes the ramp member to move between a stowed position and a deployed position in an arcuate path about the main pivot axis.

15 Claims, 13 Drawing Sheets

(56) References Cited

U.S. PATENT DOCUMENTS

| | | | |
|---|---|---|---|
| 5,338,264 | A | 8/1994 | Kempf |
| 5,391,041 | A | 2/1995 | Stanbury et al. |
| 5,632,593 | A | 5/1997 | Aoki |
| 5,676,515 | A | 10/1997 | Haustein |
| 5,678,932 | A | 10/1997 | Cohn |
| 5,803,615 | A | 9/1998 | Cohn |
| 5,865,593 | A | 2/1999 | Cohn |
| 5,871,329 | A | 2/1999 | Tidrick et al. |
| 6,010,298 | A | 1/2000 | Cohn et al. |
| 6,039,528 | A | 3/2000 | Cohn |
| RE36,805 | E | 8/2000 | Kempf |
| 6,095,747 | A | 8/2000 | Cohn |
| 6,179,545 | B1 | 1/2001 | Petersen, Jr. et al. |
| 6,186,733 | B1 | 2/2001 | Lewis et al. |
| 6,203,265 | B1 | 3/2001 | Cohn et al. |
| 6,210,098 | B1 | 4/2001 | Cohn et al. |
| 6,238,168 | B1 | 5/2001 | Cohn et al. |
| 6,343,908 | B1 * | 2/2002 | Oudsten et al. ............... 414/537 |
| 6,409,458 | B1 | 6/2002 | Cohn et al. |
| 6,536,064 | B1 | 3/2003 | Swink et al. |
| 6,602,041 | B2 | 8/2003 | Lewis et al. |
| 6,802,095 | B1 | 10/2004 | Whitmarsh et al. |
| 6,843,635 | B2 | 1/2005 | Cohn |
| 6,887,028 | B1 | 5/2005 | Kirla, Jr. |
| 6,971,834 | B2 | 12/2005 | Morris |
| 7,007,961 | B2 | 3/2006 | Leitner et al. |
| 7,326,024 | B2 * | 2/2008 | Cohn et al. ..................... 414/546 |
| 7,384,232 | B2 | 6/2008 | Morris |
| 7,500,818 | B1 | 3/2009 | Johnson |
| 7,527,467 | B2 | 5/2009 | Edwards et al. |
| 7,533,432 | B2 | 5/2009 | Morris et al. |
| 7,533,433 | B2 | 5/2009 | Morris et al. |
| 7,533,434 | B2 | 5/2009 | Morris et al. |
| 7,681,272 | B2 | 3/2010 | Morris et al. |
| 7,766,127 | B2 | 8/2010 | Morris et al. |
| 7,870,630 | B2 | 1/2011 | Johnson |
| 7,870,631 | B2 | 1/2011 | Morris et al. |
| 7,896,134 | B2 | 3/2011 | Morris et al. |
| 7,963,739 | B2 | 6/2011 | Ablabutyan et al. |
| 8,032,963 | B2 | 10/2011 | Morris et al. |
| 8,230,539 | B2 | 7/2012 | Morris et al. |
| 8,234,737 | B2 | 8/2012 | Morris et al. |
| 8,286,754 | B2 | 10/2012 | Cohn |
| 8,359,691 | B2 | 1/2013 | Morris et al. |
| 2003/0007853 | A1 | 1/2003 | Cohn et al. |
| 2004/0052625 | A1 | 3/2004 | Butterfield |
| 2004/0228713 | A1 | 11/2004 | Cohn et al. |
| 2005/0129490 | A1 | 6/2005 | Hutchins |
| 2006/0245883 | A1 | 11/2006 | Fontaine et al. |
| 2008/0271266 | A1 | 11/2008 | Johnson |

* cited by examiner

SELF-ALIGNING PLATFORM MECHANISM FOR LOW-FLOOR VEHICLES ACCESS DEVICE

BACKGROUND OF THE INVENTION

1. Field of the Invention

The present invention relates to a self-aligning platform mechanism for deploying a ramp from a vehicle floor. More specifically, the self-aligning platform mechanism includes a deploying mechanism connected between a platform and a ramp that aligns the ramp with the platform.

2. Description of Related Art

Typical vehicle ramp assemblies include a hinged platform connected to a vehicle floor and a ramp connected to the platform to be movable between a stowed position folded into the interior of the vehicle and a deployed position, in which an end of the ramp extends from the vehicle to an adjacent ground surface or curb. Typically deployment of the ramp, with respect to the platform, is undertaken by a motor or a manual mechanism.

Such deployment mechanisms do not align the pivotable ramp plate with the hinged platform attached to the vehicle floor. In such a configuration, the ramp assumes an angle with the ground resulting from the height of the axis of rotation of the ramp with respect to the ground surface or curb. The angle of the ramp is practically independent of the angle of the platform, with respect to the ground surface or curb, and for a given ramp length, the angle of the ramp aligns with the angle of the platform for one and only one combination of vehicle floor height and curb height. For all remaining cases, the angles differ, thus creating an undesirable bump or ditch between the platform and the ramp, which while not critical, is objectionable to some users as it creates difficulty in smoothly travelling between the ramp and platform.

SUMMARY OF THE INVENTION

The present invention provides for a self-aligning platform mechanism that includes a deploying mechanism connected between a hinged platform and a ramp that automatically aligns the ramp with the platform to assure the same angle of both components in relation to the ground surface for a low floor vehicle access ramp regardless of the height of the vehicle floor and the pivot axis of the ramp, with respect to the ground surface or curb.

According to an embodiment of the present invention, a mechanism for deploying and aligning a ramp relative to a platform is provided. The mechanism includes a main bearing operatively associated with the platform and rotatable about a main pivot axis; a drive member disposed on the main bearing, the drive member being adapted to drive the main bearing to rotate about the main pivot axis; a rotating member disposed on the main bearing and rotatable about the main pivot axis with the main bearing; and a ramp member rotatably connected to the rotating member at a pivot point eccentric to the main pivot axis. Rotation of the rotating member causes the ramp member to move between a stowed position and a deployed position in an arcuate path about the main pivot axis. The rotating member includes a catch element and the ramp member includes a stop element and the catch element engages the stop element to prevent relative rotation of the ramp member, with respect to the rotating member, in a direction toward the deployed position. The mechanism further includes a stationary member adapted to be fixedly connected to the platform. The main bearing is rotatably disposed on the stationary member.

The stationary member is a stationary cam defining a cam surface along a top side thereof and the stop element of the ramp member is a roller extending laterally from the ramp member to engage and roll along the cam surface of the stationary cam during movement of the ramp member between the stowed and deployed positions. The drive member is a sprocket adapted to be connected to a drive system to drive deployment and stowing of the ramp. The rotating member is a rotating cam defining a cam surface along a side thereof and the stop element of the ramp member is a roller extending laterally from the ramp member to engage and roll along the cam surface of the rotating cam during movement of the ramp member between the deployed position and an aligned position. The catch element includes a hook disposed on the rotating cam adjacent to an end of the cam surface of the rotating cam. The ramp member is rotatably connected to the rotating cam by a secondary bearing. The ramp member is a ramp bracket adapted to connect the ramp to the rotating member.

According to another embodiment of the present invention, a deployable ramp assembly for a vehicle is provided. The ramp assembly includes a platform hingedly connected to a floor of the vehicle, the platform defining a first angle with respect to a ground surface; a ramp pivotably connected to the platform and movable between a stowed position and a deployed position, the ramp defining a second angle with respect to the ground surface in the deployed position; and a deploying mechanism connected between the platform and the ramp for moving the ramp relative to the platform between the stowed and deployed positions. The deploying mechanism includes a stationary member fixedly connected to an end of the platform; a main bearing rotatably disposed on the stationary member and rotatable with respect to the stationary member about a main pivot axis; a drive member disposed on the main bearing, the drive member being adapted to drive the main bearing to rotate about the main pivot axis; and a rotating member disposed on the main bearing and rotatable about the main pivot axis with the main bearing. The ramp is rotatably connected to the rotating member at a pivot point eccentric to the main pivot axis, such that rotation of the rotating member causes the ramp to move between the stowed position and the deployed position in an arcuate path about the main pivot axis. The rotating member includes a catch element and the ramp is operatively associated with a stop element and the catch element engages the stop element to prevent relative rotation of the ramp with respect to the rotating member in a direction toward the deployed position. Further rotation of the rotating member after the ramp reaches the deployed position causes the ramp to pivot with respect to the rotating member to move the ramp to an aligned position, wherein the second angle of the ramp equals the first angle of the platform.

The ramp is connected to the rotating member by a ramp bracket. The stationary member is a stationary cam defining a cam surface along a top side thereof and the stop element is a roller extending laterally from the ramp bracket to engage and roll along the cam surface of the stationary cam during movement of the ramp bracket between the stowed and deployed positions. The rotating member is a rotating cam defining a cam surface along a side thereof and the stop element is a roller extending laterally from the ramp bracket to engage and roll along the cam surface of the rotating cam during movement of the ramp member between the deployed position and the aligned position. The catch element includes a hook disposed on the rotating cam adjacent to an end of the cam surface of the rotating cam. The ramp bracket is rotatably connected to the rotating cam by a secondary bearing. The ramp assembly further includes a drive system connected to the drive member to drive deployment, stowing and alignment of the ramp. The drive member is a sprocket and the drive system includes a motor. The ramp assembly also includes a switch disposed on the ramp. When the ramp reaches an aligned position with respect to the platform, the switch is actuated to stop the motor of the drive system.

According to yet another embodiment of the present invention, a method of deploying and aligning a vehicle ramp, with respect to a platform, is provided. The method includes the steps of providing a platform hingedly connected to a floor of the vehicle, the platform defining a first angle with respect to a ground surface; providing a ramp; and providing a deploying mechanism that includes a stationary cam fixedly connected to an end of the platform, the stationary cam defining a cam surface along a top side thereof; a main bearing rotatably disposed on the stationary member and rotatable, with respect to the stationary cam, about a main pivot axis; a drive member disposed on the main bearing; a rotating cam disposed on the main bearing and rotatable about the main pivot axis with the main bearing, the rotating cam defining a cam surface along a side thereof and including a hook disposed on the rotating cam adjacent to an end of the cam surface of the rotating cam; and a ramp bracket rotatably connected to the rotating cam at a pivot point eccentric to the main pivot axis, the ramp bracket being connected to the ramp and including a roller extending laterally from the ramp bracket. A motor connected to the drive member of the deploying mechanism and a switch on the ramp is provided. The motor is activated to cause the drive member to drive the main bearing to rotate about the main pivot axis. The ramp is moved from a stowed position overlapping the platform by rotating the rotating cam and engaging the cam surface of the stationary cam with the roller of the ramp bracket to cause the ramp to pivot upward in an arcuate path about the main pivot axis. The ramp is then moved to a deployed position by further rotating the rotating cam and engaging the roller of the ramp bracket with the hook of the rotating cam to cause the ramp to pivot downward along the arcuate path, the ramp defining a second angle, with respect to the ground surface, in the deployed position. A proximal end of the ramp is aligned with the platform by further rotating the rotating cam and engaging the cam surface of the rotating cam with the roller of the ramp bracket to cause the proximal end of the ramp to pivot, with respect to the rotating cam, about the pivot point. The switch is actuated to stop the motor when the second angle of the ramp equals the first angle of the platform and the proximal end of the ramp reaches an aligned position, with respect to the platform.

Further details and advantages of the invention will become clear upon reading the following detailed description in conjunction with the accompanying drawing figures, wherein like parts are designated with like reference numerals throughout.

DESCRIPTION OF PREFERRED EMBODIMENTS

For purposes of the description hereinafter, spatial orientation terms, if used, shall relate to the referenced embodiment as it is oriented in the accompanying drawing figures or otherwise described in the following detailed description. However, it is to be understood that the embodiments described hereinafter may assume many alternative variations and embodiments. It is also to be understood that the specific devices illustrated in the accompanying drawing figures and described herein are simply exemplary and should not be considered as limiting.

Figure 1:
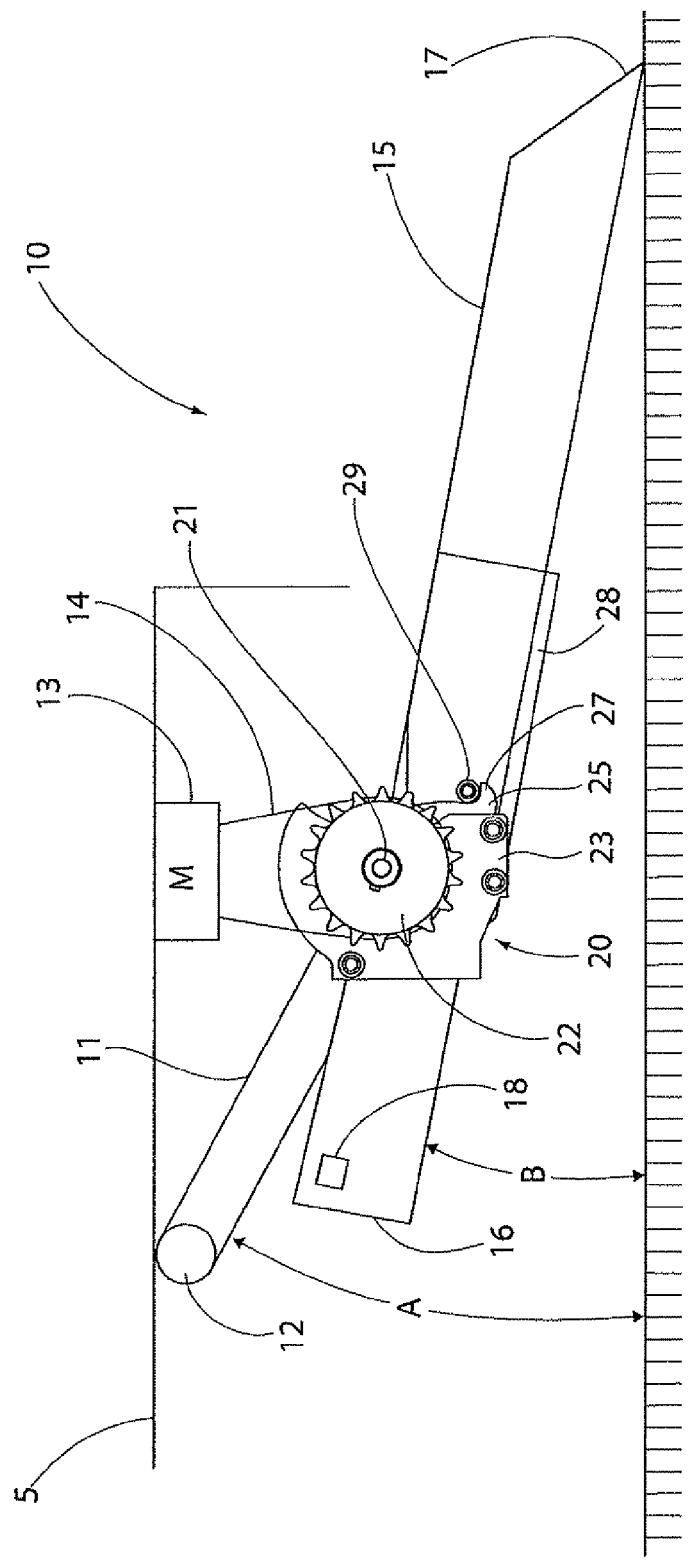
FIG. 1 is a side view of a self-aligning ramp assembly according to an embodiment of the present invention.

Referring to FIG. 1, a self-aligning ramp assembly 10 according to an embodiment of the present invention is shown. The ramp assembly 10 includes a platform 11 connected to a vehicle floor 5 by a hinge 12 such that the platform 11 is pivotable between a raised position flush with the vehicle floor 5 and a lowered position. In the lowered position, the platform 11 forms a first angle A with the ground surface 6. The ramp assembly 10 further includes a ramp 15 pivotably connected to the platform 11 by a deploying mechanism 20 attached to the ramp 15 at an intermediate portion of the ramp 15. The ramp 15 extends between a proximal end 16 and a distal end 17. The ramp 15 is movable relative to the platform 11 by the deploying mechanism between a stowed position, in which the ramp 15 is folded inward and overlaps the platform 11 and a deployed position, shown in FIG. 1, in which the ramp 15 extends outward from the platform 11 such that the distal end 17 of the ramp 15 contacts the ground surface 6. In the deployed position, the ramp 15 forms a second angle B with respect to the ground surface 6. It is to be appreciated that the ground surface 6 contacted by the distal end 17 of the ramp 15 may be a level area or may be raised with respect to the wheels of the vehicle, such as a curb.

The ramp 15 is driven through deployment, stowing and alignment by a drive system operatively associated with a drive member 22 of the deploying mechanism 20. As shown, the drive system includes an electric motor 13 connected to the vehicle floor 5 in such a way so as to not interfere with the movement of the platform 11 and the ramp 15. The electric motor 13 drives rotation of the drive member 22 by way of a belt or chain 14 surrounding an output of the motor 13 and the drive member 22. It is to be appreciated that any drive system, including a manual system, known to be suitable to those having ordinary skill in the art may be used to move the ramp 15 between the stowed and deployed positions. As shown, the drive member 22 is a sprocket, though it is to be appreciated that the drive member 22 could also be a pulley or sheave or any other suitable member known to those having ordinary skill in the art. A switch 18 is provided at the proximal end 16 of the ramp 15. The switch 18 is operatively connected to the motor 13 so as to stop the motor 13 when the proximal end 16 of the ramp 15 aligns with the platform 11, as will be discussed below. Further, a load-compensating mechanism may be provided to substantially reduce manual operating force of the drive system.

Figure 2:
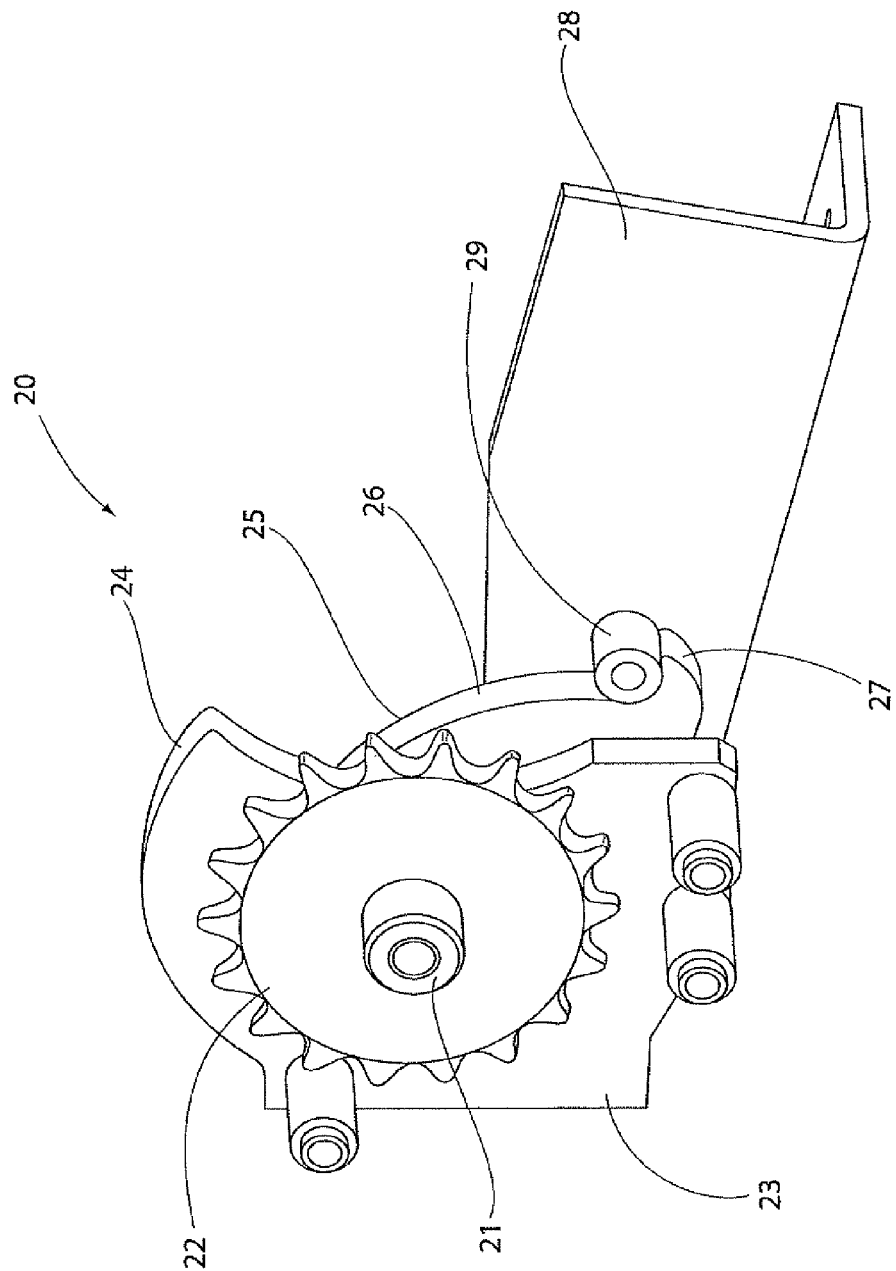
FIG. 2 is a front perspective view of a deploying mechanism of the self-aligning ramp assembly shown in FIG. 1.
Figure 3:
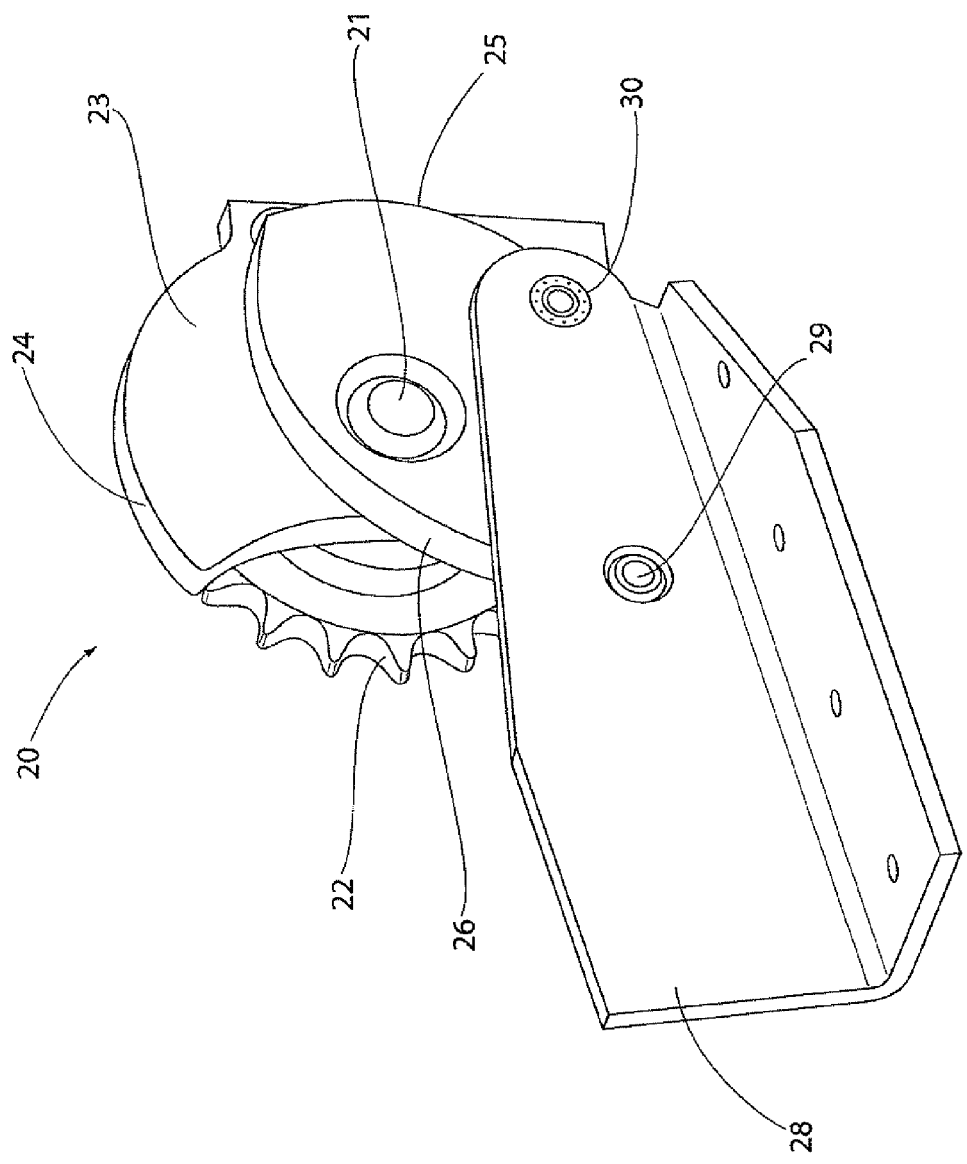
FIG. 3 is a rear perspective view of the deploying mechanism.
Figure 4:
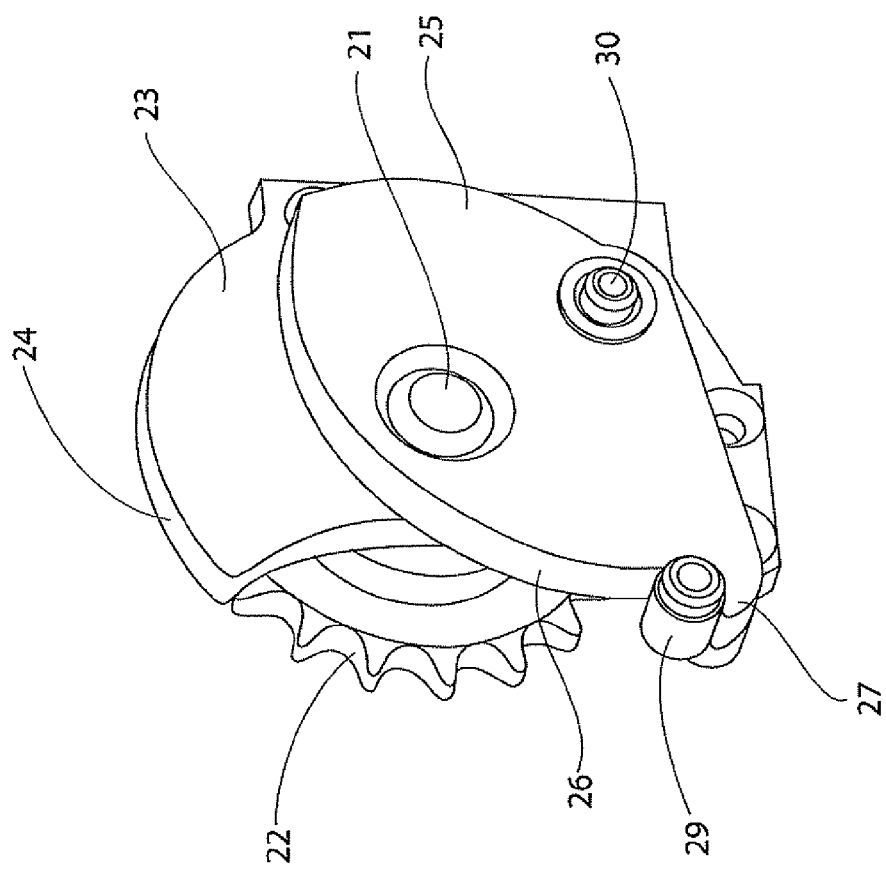
FIG. 4 is a rear perspective view of the deploying mechanism with the ramp bracket removed.

With reference to FIGS. 2-4, a deploying mechanism 20 connected between the platform 11 and the ramp 15 for moving the ramp 15 relative to the platform 11 between the stowed and deployed positions and aligning the ramp 15 with the platform 11, according to an embodiment of the present invention, is shown. The deploying mechanism 20 includes a stationary member 23 fixedly connected to an end of the platform 11. As shown, the stationary member is a stationary cam 23 that defines a cam surface 24 along a top side of the stationary cam 23. A main bearing 21 is passed through the stationary cam 23 to be rotatably disposed on the stationary cam 23 and rotatable with respect to the stationary cam 23 about a main pivot axis P. Accordingly, the main bearing 21 is operatively associated with the platform 11 to rotate, with respect to the platform 11. The drive member 22 is disposed on the main bearing 21 to drive the main bearing 21 to rotate about the main pivot axis P and drive deployment and stowing of the ramp 15.

A rotating member 25 is also disposed on the main bearing 21 and is rotatable about the main pivot axis P with the main bearing 21. As shown, the rotating member is a rotating cam 25 that defines a cam surface 26 along a side of the rotating cam 25. The deploying mechanism 20 also includes a ramp member 28, which is rotatably connected to the rotating cam 25 by a secondary bearing 30 to a pivot point PP for the ramp member 28 eccentric to the main pivot axis P of the main bearing 21. As shown, the ramp member is a ramp bracket 28 that is fastened to the ramp 15 to rotatably connect the ramp 15 to the rotating cam 25 and the deploying mechanism 20. It is to be appreciated that the ramp 15 may be connected to the rotating cam 25 by any component known to be suitable by those having ordinary skill in the art or the ramp 15 may be directly connected to the rotating cam 25 and the ramp bracket 28 removed, such that the portion of the ramp 15 connected to the rotating cam 25 acts as the ramp member.

The rotating cam 25 includes a catch element 27, in the form of a hook 27, disposed on the rotating cam 25 adjacent to an end of the cam surface 26 of the rotating cam 25. The ramp bracket 28 includes a stop element 29, in the form of a roller 29, extending laterally from the ramp bracket 28 in a direction toward the stationary cam 23 and the rotating cam 25. During deployment and stowing of the ramp 15, the hook 27 engages the roller 29 to prevent relative rotation of the ramp bracket 28, and thus the ramp 15, with respect to the rotating cam 25 in a direction toward the deployed position (i.e., the clockwise direction of FIG. 1).

Figure 5:
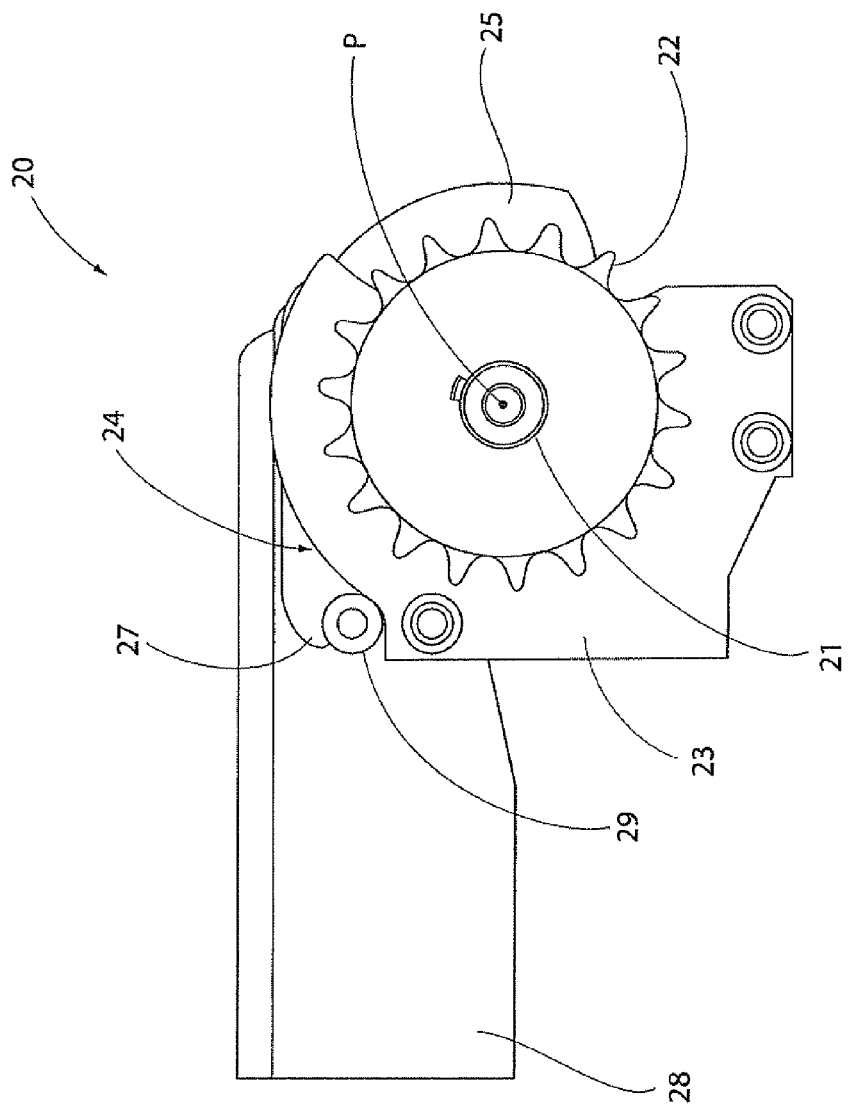
FIG. 5 is a front side view of the deploying mechanism in the stowed position.
Figure 6:
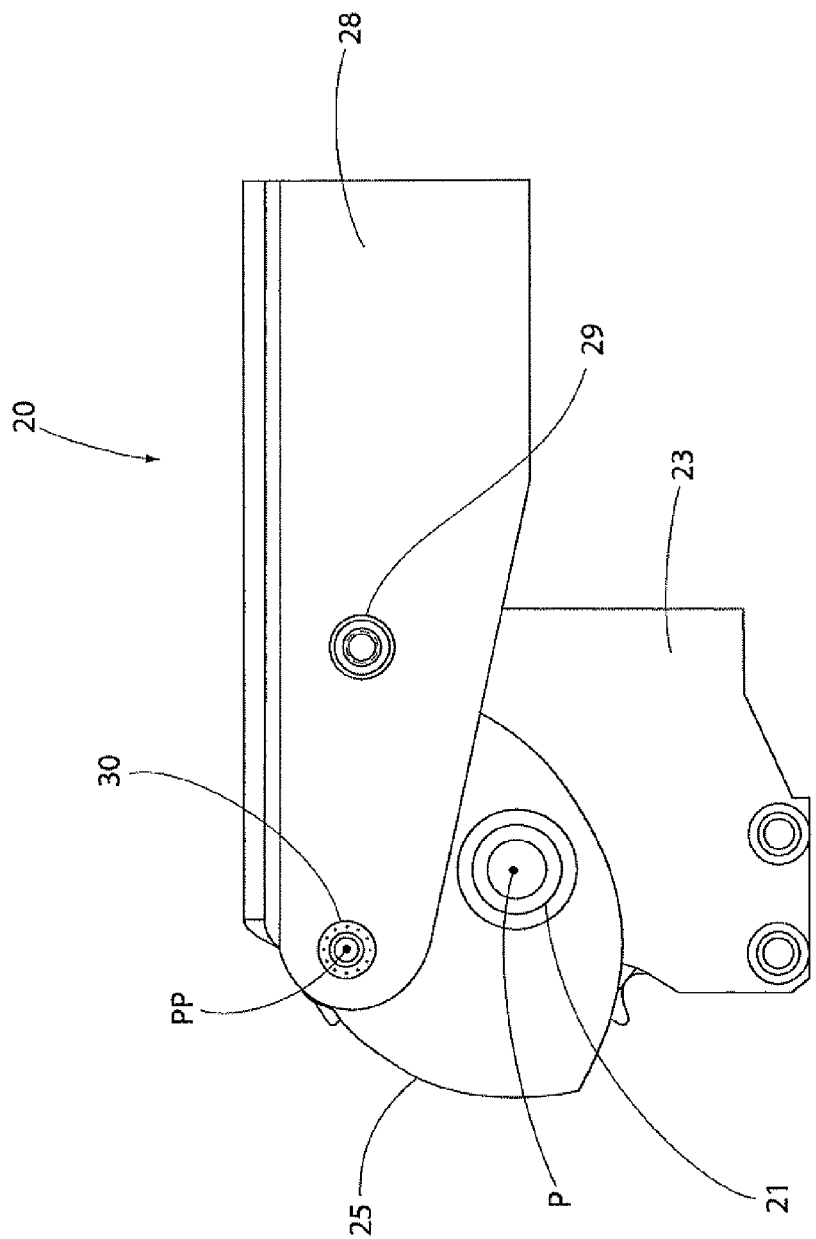
FIG. 6 is a rear side view of the deploying mechanism in the stowed position.
Figure 7:
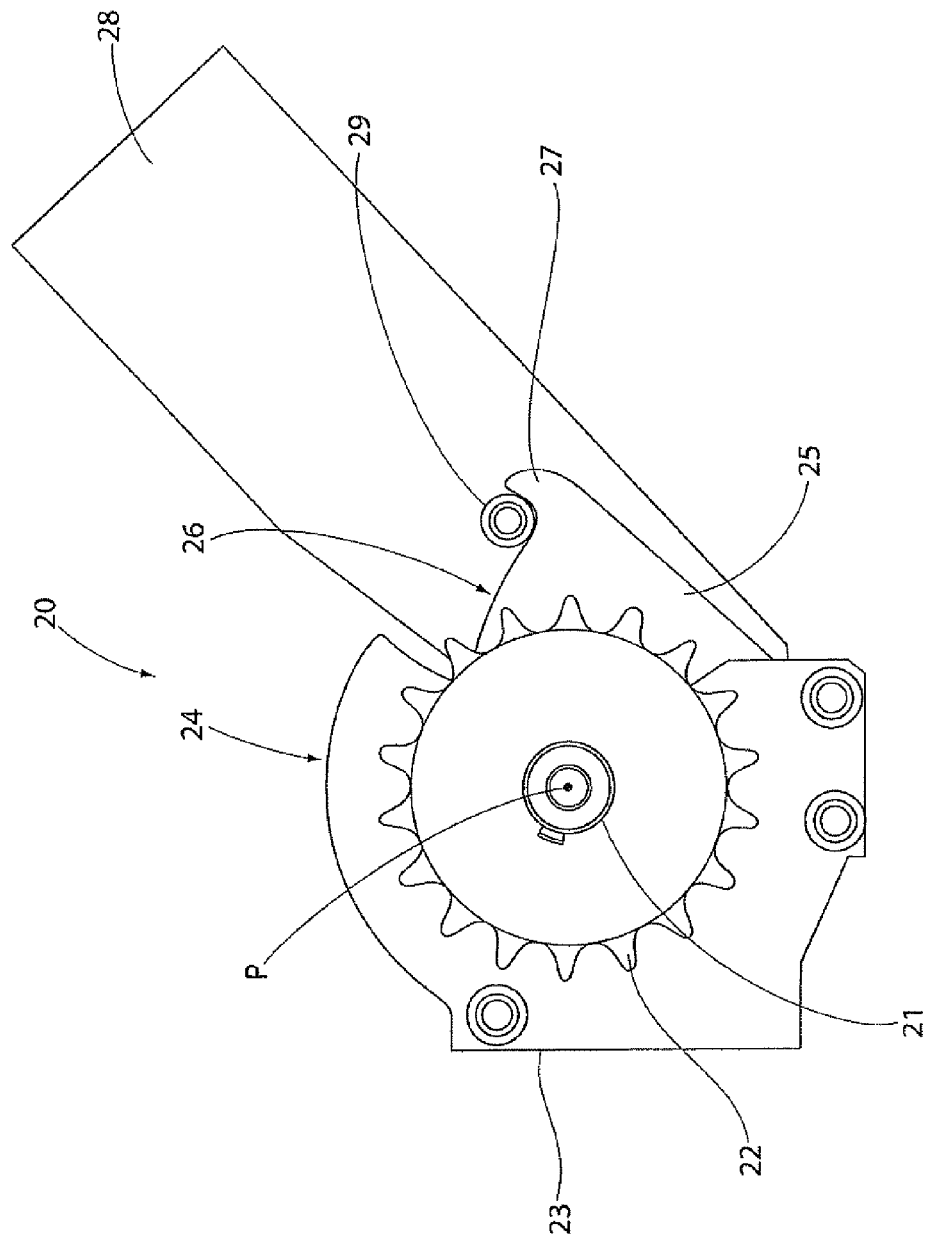
FIG. 7 is a front side view of the deploying mechanism during deployment of the ramp.
Figure 8:
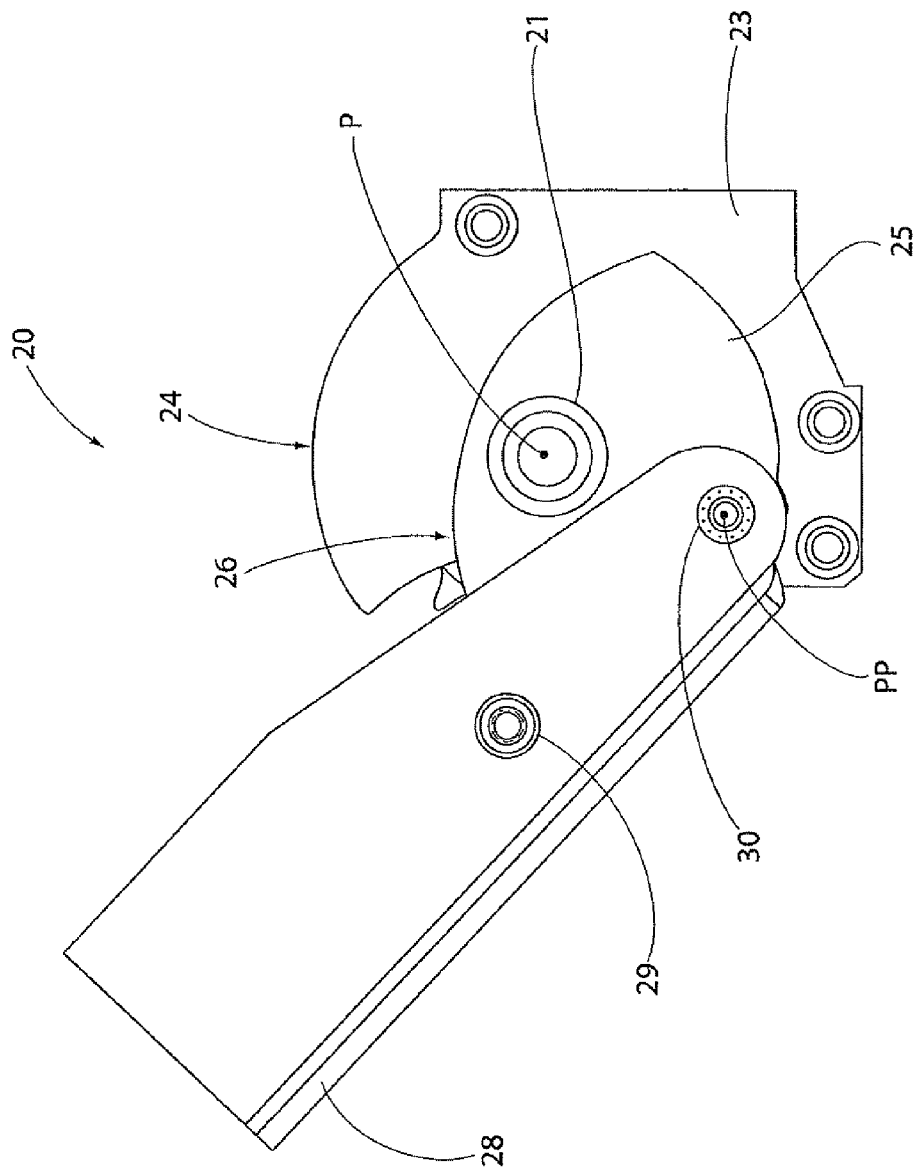
FIG. 8 is a rear side view of the deploying mechanism during deployment of the ramp.

As shown in FIGS. 5-13, which illustrate the relative movement of the stationary cam 23, the rotating cam 25 and the ramp bracket 28; rotation of the rotating cam 25 causes the ramp bracket 28, and thus the ramp 15, to move between a stowed position (FIGS. 5 and 6) and a deployed position (FIGS. 9 and 10) in an arcuate path about the main pivot axis P. As the secondary bearing 30 defining the pivot point PP is disposed on the rotating cam 25 eccentric to the main pivot axis P the secondary bearing 30, and thus the end of the ramp bracket 28 connected to the secondary bearing 30, circumscribes a circular path about the main pivot axis P as the rotating cam 25 rotates about the main bearing 21. As shown in FIGS. 5 and 6, the roller 29 extends from the ramp bracket 28 to engage and roll along the cam surface 24 of the stationary cam 23 during movement of the ramp bracket 28 between the stowed and deployed positions when the ramp bracket 28 is proximal to the stowed position to cause the ramp bracket 28 to rotate about the main pivot axis P. As shown in FIGS. 7 and 8, the roller 29 of the ramp bracket 28 is received within the hook 27 of the rotating cam 25 so the ramp bracket 28 is prevented from falling during deployment and is lifted upward by the rotating cam 25 during stowing.

Figure 11:
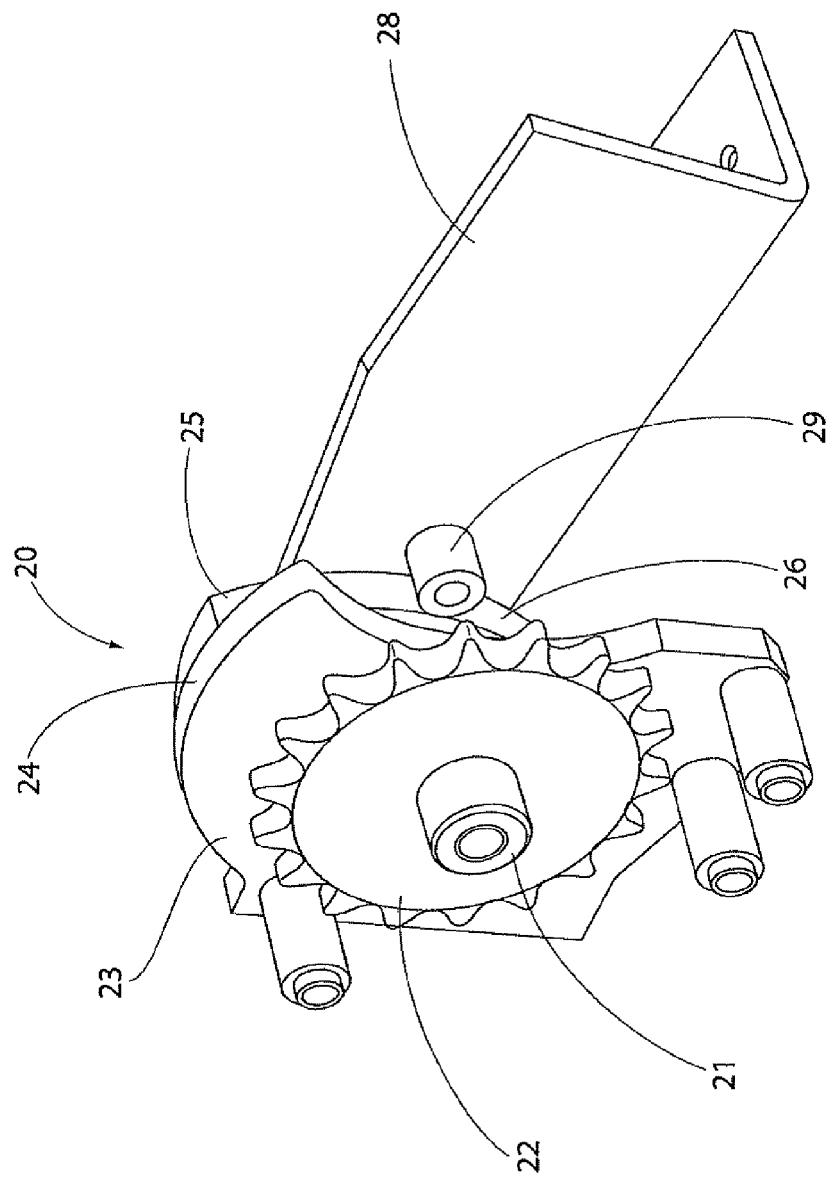
FIG. 11 is a front perspective view of the deploying mechanism in the aligned position.
Figure 12:
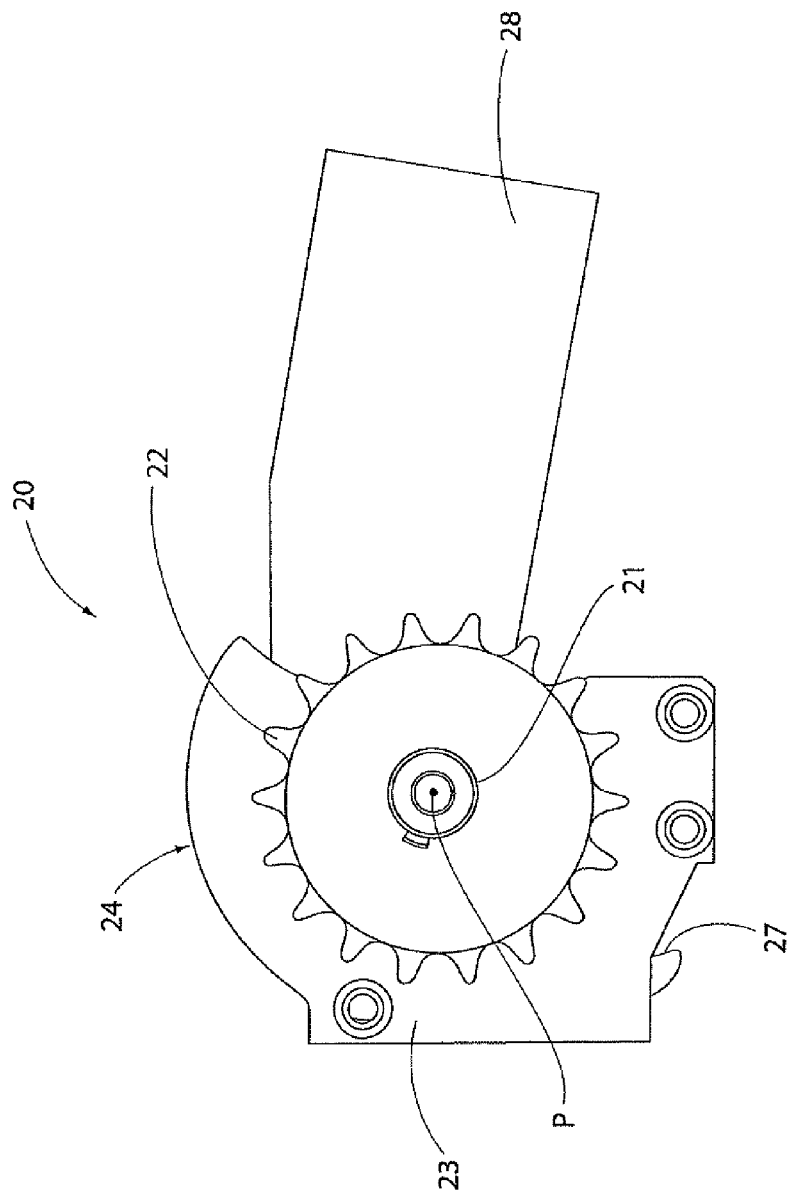
FIG. 12 is a front side view of the deploying mechanism in the aligned position.
Figure 13:
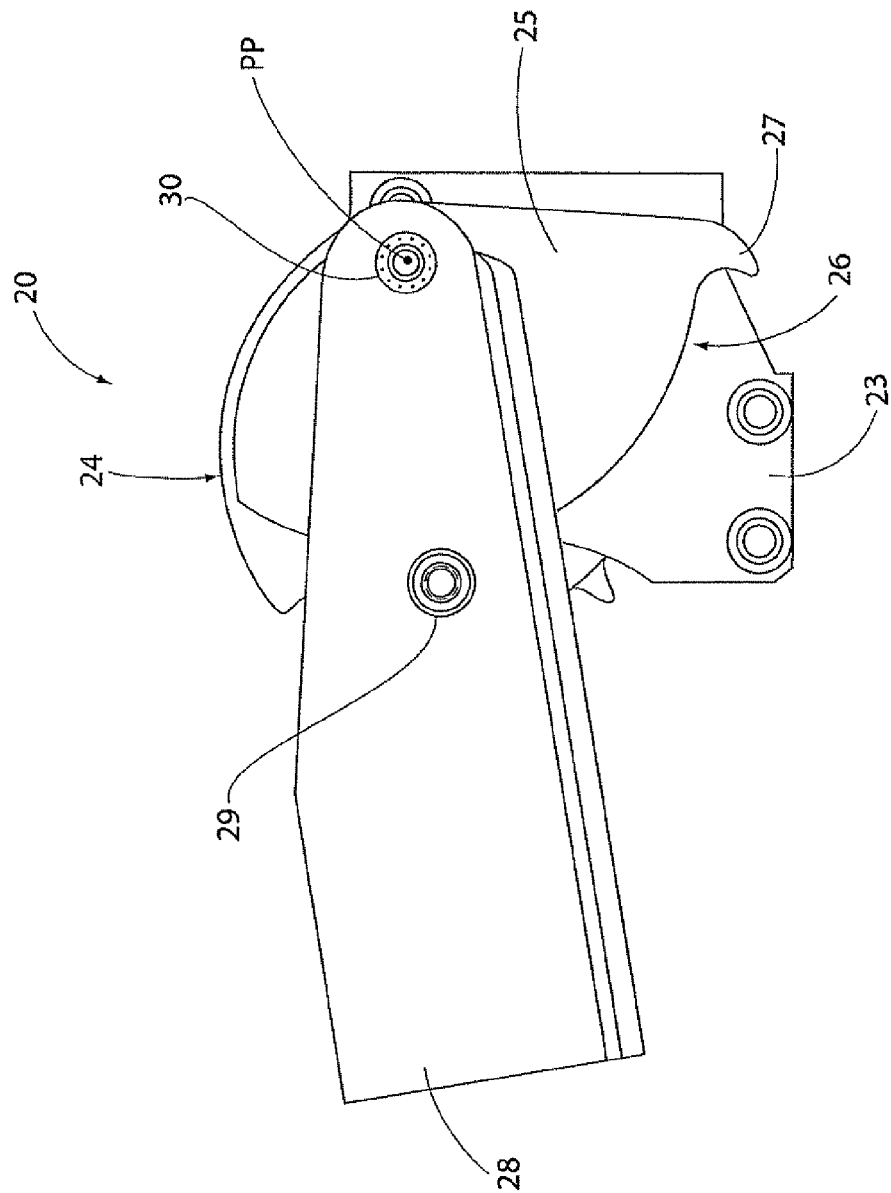
FIG. 13 is a rear side view of the deploying mechanism in the aligned position.

As shown in FIGS. 11-13, further rotation of the rotating cam 25 after the ramp 15 reaches the deployed position causes the ramp bracket 28, and thus the proximal end 16 of the ramp 15, to pivot with respect to the rotating cam 25 to move the proximal end 16 of the ramp 15 to an aligned position, in which the second angle B of the ramp 15 equals the first angle A of the platform 11. During alignment of the ramp 15 with the platform 11 from the deployed position, the roller 29 of the ramp bracket 28 engages and rolls along the cam surface 26 of the rotating cam 25.

With reference to FIGS. 5-13, an operation cycle of deploying and aligning the vehicle ramp 15, with respect to the platform 11, begins with the ramp 15 in a stowed position (FIGS. 5 and 6) overlapping the platform 11 and forming an angle of approximately 0° with the platform 11. The motor 13 is activated to cause the drive member 22 to drive the main bearing 21 to rotate about the main pivot axis P with respect to the stationary cam 23. Rotation of the main bearing 21 causes the rotating cam 25 to rotate as well, which drives the secondary bearing 30 and end of the ramp bracket 28. The secondary bearing 30 and the end of the ramp bracket 28 are connected to the rotating cam 25 eccentric to the main bearing 21 and move from the stowed position in an arcuate path about the main pivot axis P. The roller 29 of the ramp bracket 28 engages and rolls along the cam surface 24 of the stationary cam 23 to pivot the ramp bracket 28 and ramp 15 upward in an arcuate path about the main pivot axis P.

Figure 9:
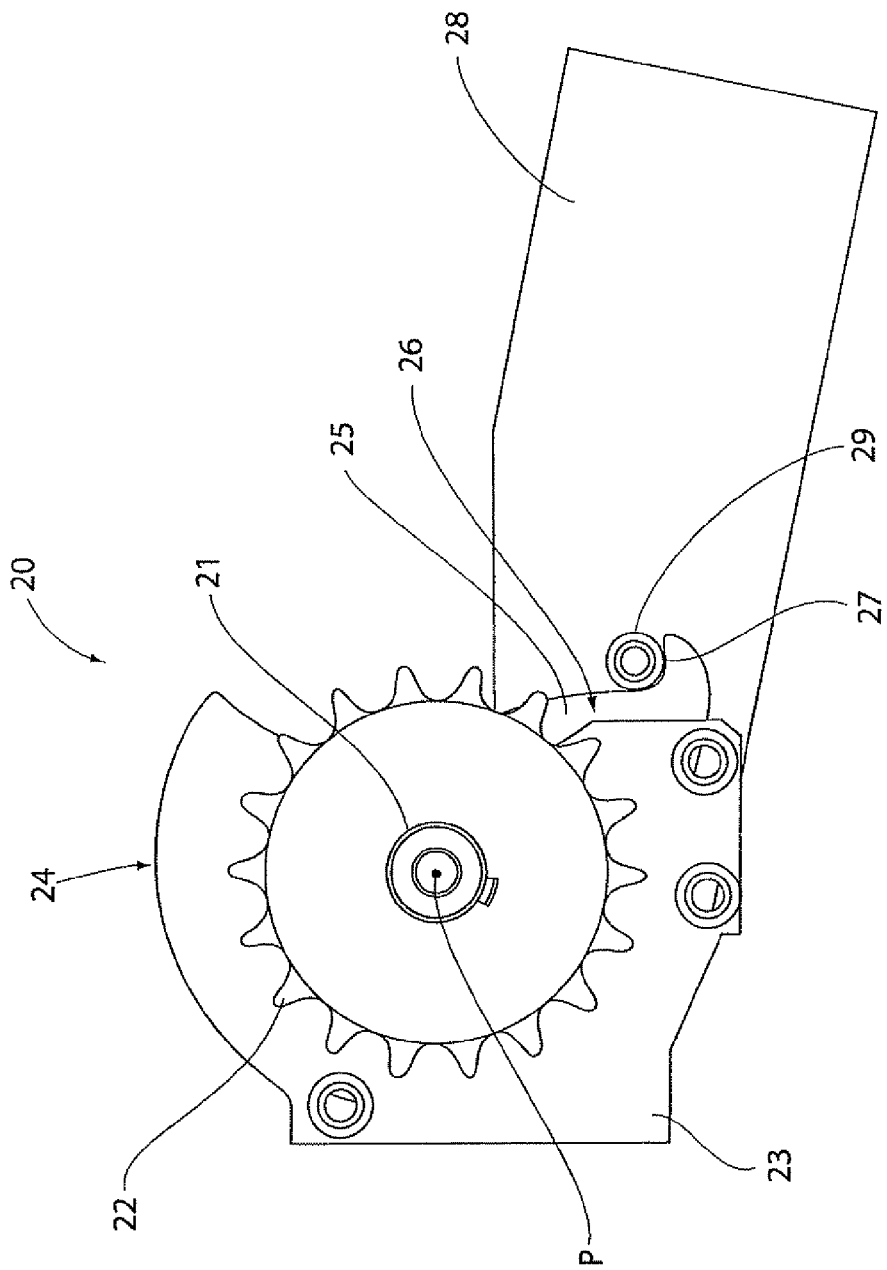
FIG. 9 is a front side view of the deploying mechanism in the deployed position.
Figure 10:
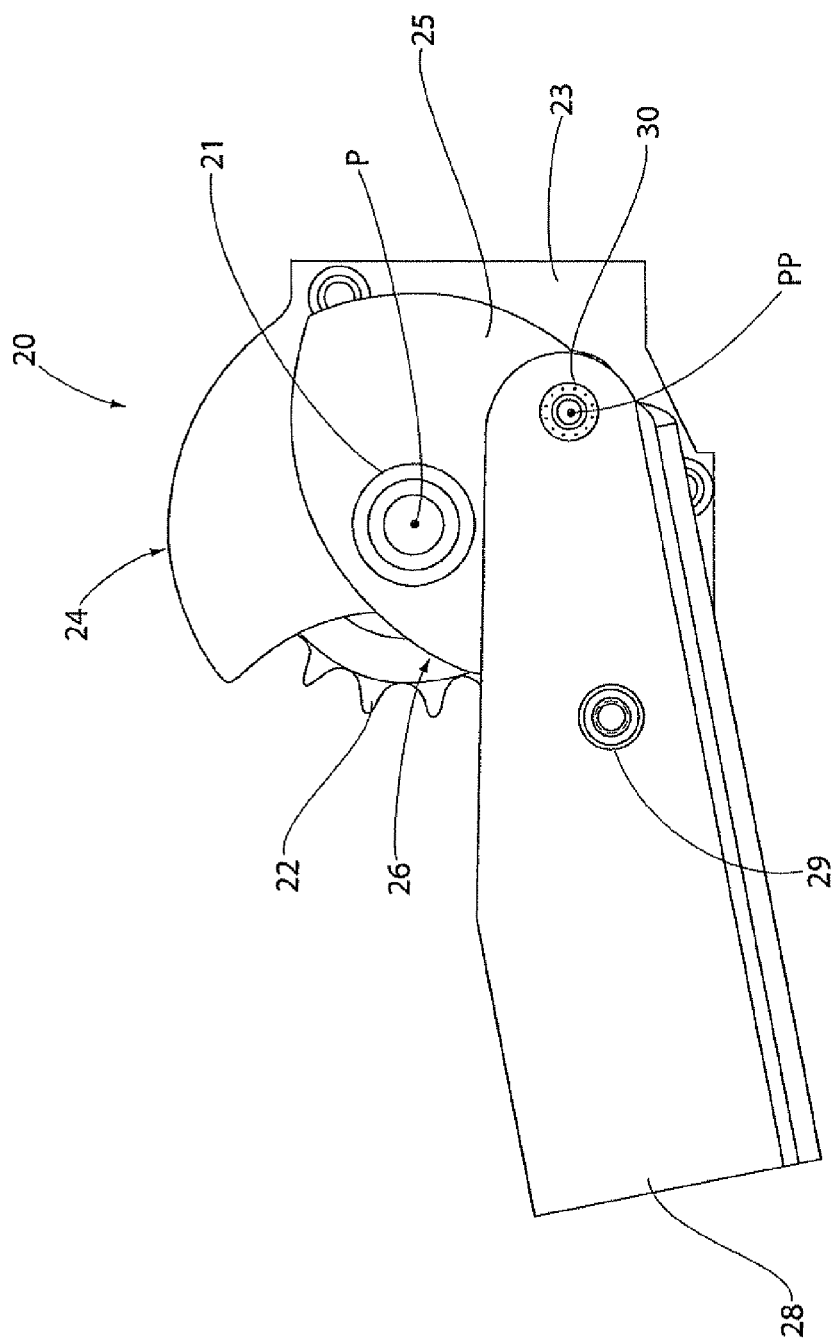
FIG. 10 is a rear side view of the deploying mechanism in the deployed position.

The ramp 15 is moved to a deployed position by further rotating the rotating cam 25 to a neutral position forming an angle of approximately 90° with the platform 11. The roller 29 of the ramp bracket 28 is then engaged by the hook 27 of the rotating cam 25 (FIGS. 7 and 8) to cause the ramp 15 to pivot downward along the arcuate path without free falling until ramp 15 reaches the deployed position. In the deployed position, the distal end 17 of the ramp 15 touches the ground surface 6 and the ramp 15 forming a second angle B with respect to the ground surface 6 (FIGS. 1, 9 and 10).

As the proximal end 17 of the ramp 15 touches the ground surface 6, the rotating cam 25 continues to rotate and the roller 29 disengages from the hook 27 to engage the cam surface 26 of the rotating cam 25 and cause the proximal end 16 of the ramp 15 to pivot, with respect to the rotating cam 25, about the pivot point PP. The secondary bearing 30 and end of the ramp bracket 28 are lifted upward to align the proximal end 16 of the ramp 15 with the platform 11 (FIGS. 11-13). When the second angle B equals the first angle A the ramp 15 reaches the aligned position with respect to the platform 11 and the switch 18 is actuated, for instance by engaging the platform 11, to stop the motor 13 to freeze the deploying mechanism 20 in position. The ramp 15 is then ready for passenger traffic (wheelchairs, pedestrians, etc.) with the surfaces of the platform 11 and the ramp 15 forming a single smooth path without dips or bumps, thus greatly improving the ride of a wheelchair across the platform 11 and ramp 15, especially a manually operated wheelchair.

To move the ramp 15 from the aligned position back to the stowed position the operation is reversed. Stowing begins with disabling the switch 18 to unfreeze the motor 13. The motor 13 is then activated to rotate the rotating cam 25 in the opposite direction until the hook 27 engages the roller 29 to lift the distal end 17 of the ramp 15 from the ground surface 6. The ramp 15 is then rotated through the neutral position (90°) to the fully stowed position) (0°).

While several embodiments of a self-aligning platform mechanism for low-floor vehicles access device were described in the foregoing detailed description, those skilled in the art may make modifications and alterations to these embodiments without departing from the scope and spirit of the invention. Accordingly, the foregoing description is intended to be illustrative rather than restrictive. The invention described hereinabove is defined by the appended claims and all changes to the invention that fall within the meaning and the range of equivalency of the claims are embraced within their scope.

The invention claimed is:

1. A mechanism for deploying and aligning a ramp relative to a platform, comprising:
   a main bearing operatively associated with the platform and rotatable about a main pivot axis;
   a drive member disposed on the main bearing, the drive member being adapted to drive the main bearing to rotate about the main pivot axis;
   a stationary cam adapted to be fixedly connected to the platform, wherein the main bearing is rotatably disposed on the stationary cam;
   a rotating cam disposed on the main bearing and rotatable about the main pivot axis with the main bearing; and
   a ramp member rotatably connected to the rotating cam at a pivot point eccentric to the main pivot axis,
   wherein rotation of the rotating cam causes the ramp member to move between a stowed position and a deployed position in an arcuate path about the main pivot axis,
   wherein the rotating cam includes a catch element and the ramp member includes a stop element and the catch element engages the stop element to prevent relative rotation of the ramp member, with respect to the rotating cam, in a direction toward the deployed position, and
   wherein the stationary cam defines a cam surface along a top side thereof, the rotating cam defines a cam surface along a side thereof, and the stop element of the ramp member is a roller extending laterally from the ramp member to engage and roll along the cam surface of the stationary cam to cause movement of the ramp member in the arcuate path from the stowed position toward the deployed position and to engage and roll along the cam surface of the rotating cam to cause movement of the ramp member from the deployed position to an aligned position.

2. The mechanism according to claim 1, wherein the drive member is a sprocket adapted to be connected to a drive system to drive deployment and stowing of the ramp.

3. The mechanism according to claim 1, wherein the catch element comprises a hook disposed on the rotating cam adjacent to an end of the cam surface of the rotating cam.

4. The mechanism according to claim 1, wherein the ramp member is rotatably connected to the rotating cam by a secondary bearing.

5. The mechanism according to claim 1, wherein the ramp member is a ramp bracket adapted to connect the ramp to the rotating cam.

6. A deployable ramp assembly for a vehicle, comprising:
   a platform hingedly connected to a floor of the vehicle, the platfolin defining a first angle with respect to a ground surface;
   a ramp pivotably connected to the platform and movable between a stowed position and a deployed position, the ramp defining a second angle, with respect to the ground surface, in the deployed position; and
   a deploying mechanism connected between the platform and the ramp for moving the ramp relative to the platform between the stowed and deployed positions, the deploying mechanism comprising:
   a stationary cam fixedly connected to an end of the platform;
   a main bearing rotatably disposed on the stationary cam and rotatable, with respect to the stationary cam, about a main pivot axis;
   a drive member disposed on the main bearing, the drive member being adapted to drive the main bearing to rotate about the main pivot axis; and
   a rotating cam disposed on the main bearing and rotatable about the main pivot axis with the main bearing;
   wherein the ramp is rotatably connected to the rotating cam at a pivot point eccentric to the main pivot axis, such that rotation of the rotating cam causes the ramp to move between the stowed position and the deployed position in an arcuate path about the main pivot axis,
   wherein the rotating cam includes a catch element and the ramp is operatively associated with a stop element and the catch element engages the stop element to prevent relative rotation of the ramp, with respect to the rotating cam, in a direction toward the deployed position, and
   wherein the stationary cam defines a cam surface along a top side thereof, the rotating cam defines a cam surface along a side thereof, and the stop element of the ramp member is a roller extending laterally from the ramp member to engage and roll along the cam surface of the stationary cam to cause movement of the ramp member in an arcuate path from the stowed position toward the deployed position and to engage and roll along the cam surface of the rotating cam to cause movement of the ramp member from the deployed position to an aligned position.

7. The deployable ramp assembly according to claim 6, wherein further rotation of the rotating cam after the ramp reaches the deployed position causes the ramp to pivot, with respect to the rotating cam, to move the ramp to an aligned position, wherein the second angle of the ramp equals the first angle of the platform.

8. The deployable ramp assembly according to claim 6, wherein the ramp is connected to the rotating cam by a ramp bracket.

9. The deployable ramp assembly according to claim 6, wherein the catch element comprises a hook disposed on the rotating cam adjacent to an end of the cam surface of the rotating cam.

10. The deployable ramp assembly according to claim 9, wherein the ramp bracket is rotatably connected to the rotating cam by a secondary bearing.

11. The deployable ramp assembly according to claim 6, further comprising a drive system connected to the drive member to drive deployment, stowing and alignment of the ramp.

12. The deployable ramp assembly according to claim 11, wherein the drive member is a sprocket.

13. The deployable ramp assembly according to claim 11, wherein the drive system includes a motor.

14. The deployable ramp assembly according to claim 13, further comprising a switch disposed on the ramp,
   wherein when the ramp reaches the aligned position, with respect to the platform, the switch is actuated to stop the motor of the drive system.

15. A method of deploying and aligning a vehicle ramp, with respect to a platform, comprising the steps of:
  providing a platform hingedly connected to a floor of the vehicle, the platform defining a first angle with respect to a ground surface;
  providing a ramp;
  providing a deploying mechanism that comprises:
    a stationary cam fixedly connected to an end of the platform, the stationary cam defining a cam surface along a top side thereof;
    a main bearing rotatably disposed on the stationary member and rotatable, with respect to the stationary cam, about a main pivot axis;
    a drive member disposed on the main bearing;
    a rotating cam disposed on the main bearing and rotatable about the main pivot axis with the main bearing, the rotating cam defining a cam surface along a side thereof and including a hook disposed on the rotating cam adjacent to an end of the cam surface of the rotating cam; and
    a ramp bracket rotatably connected to the rotating cam at a pivot point eccentric to the main pivot axis, the ramp bracket being connected to the ramp and including a roller extending laterally from the ramp bracket;
  providing a motor connected to the drive member of the deploying mechanism and a switch on the ramp;
  activating the motor to cause the drive member to drive the main bearing to rotate about the main pivot axis;
  moving the ramp from a stowed position overlapping the platform by rotating the rotating cam and engaging the cam surface of the stationary cam with the roller of the ramp bracket to cause the ramp to pivot upward in an arcuate path about the main pivot axis;
  moving the ramp to a deployed position by further rotating the rotating cam and engaging the roller of the ramp bracket with the hook of the rotating cam to cause the ramp to pivot downward along the arcuate path, the ramp defining a second angle, with respect to the ground surface, in the deployed position;
  aligning a proximal end of the ramp with the platform by further rotating the rotating cam and engaging the cam surface of the rotating cam with the roller of the ramp bracket to cause the proximal end of the ramp to pivot, with respect to the rotating cam, about the pivot point;
  actuating the switch to stop the motor when the second angle of the ramp equals the first angle of the platform and the proximal end of the ramp reaches an aligned position, with respect to the platform.

\* \* \* \* \*

UNITED STATES PATENT AND TRADEMARK OFFICE
CERTIFICATE OF CORRECTION

PATENT NO.       : 8,517,659 B2
APPLICATION NO.  : 13/063384
DATED            : August 27, 2013
INVENTOR(S)      : Koretsky et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 106 days.

Signed and Sealed this

Fifteenth Day of September, 2015

Michelle K. Lee
*Director of the United States Patent and Trademark Office*